July 8, 1969  H. HECHENLEITNER  3,453,805
APPARATUS FOR ADVANCING FILLED CONTAINERS OF
COATED PAPER, PLASTIC MATERIAL, AND THE LIKE
Filed Aug. 2, 1967
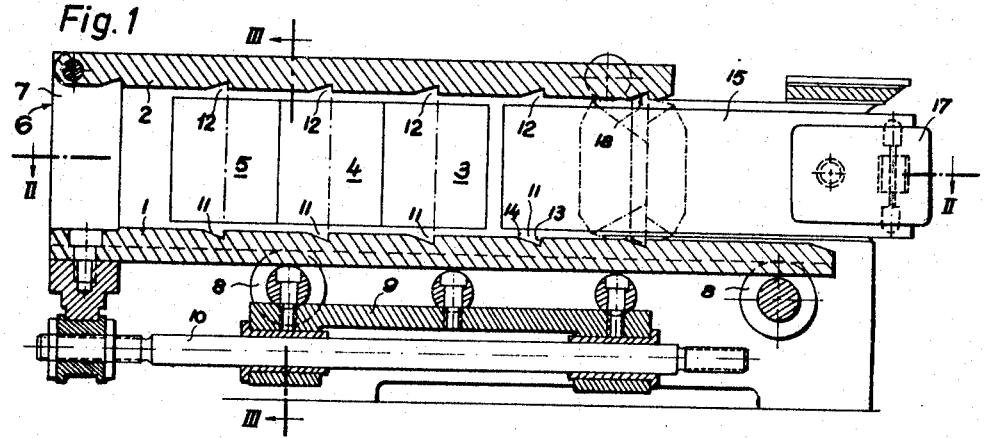
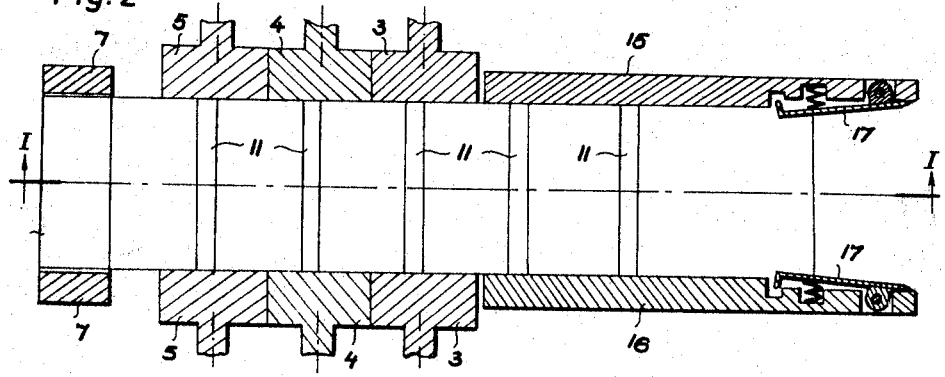
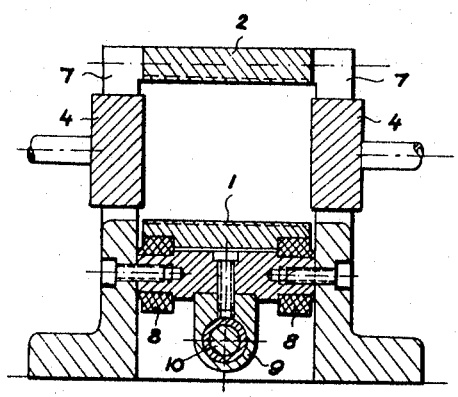
INVENTOR.
Hans Hechenleitner
BY Ernest F. Montague
Attorney

United States Patent Office 3,453,805
Patented July 8, 1969

3,453,805
APPARATUS FOR ADVANCING FILLED CONTAINERS OF COATED PAPER, PLASTIC MATERIAL, AND THE LIKE
Hans Hechenleitner, Villach, Austria, assignor to Hechenleitner & Cie, Villach, Austria, a corporation of Austria
Filed Aug. 2, 1967, Ser. No. 657,845
Claims priority, application Austria, Oct. 10, 1966, A 9,461/66
Int. Cl. B65b 51/10
U.S. Cl. 53—387      4 Claims

ABSTRACT OF THE DISCLOSURE

An apparatus for advancing and finishing liquid filled containers with welding seams of coated paper, plastic material and the like, the apparatus being located behind a machine for making the containers with welding seams comprising a plurality of finishing units arranged in series, comprising, a longitudinally extending ground plate and a longitudinally extending cover plate operatively connected thereto and spaced in parallel therefrom by a distance which corresponds to the height of the containers. The finishing units are each oppositely arranged in pairs on both sides of the plates facing into the space between the plates and spaced so as to exert a pressure from both sides on the containers adjacent thereto. A means for moving the ground plate and the cover plate in a longitudinal feeding direction as well as in an opposite direction dependent on the rhythm of the machine is provided and a slide means for pushing the containers for entering between the plates is provided. At least one of the plates is formed on its inner surface facing the other plate with transverse grooves each having a saw-tooth shape and including a vertical wall and a slanted wall, the vertical wall of adjacent transverse grooves being spaced a distance in the longitudinal direction corresponding to the width of one container. Each vertical wall is located ahead of the slanting wall of the same transverse groove in the feeding direction and at least several of said vertical walls are located centrally between the plurality of finishing units, respectively, after movement of the plates.

---

The present invention relates to an apparatus for advancing filled square containers of coated paper, plastic material or the like by means of oppositely arranged devices of finishing units arranged in series, said apparatus being located behind a machine for making containers, and adapted to push the containers with welding seams into the apparatus by means of a slide.

The finishing units which are fed by the advancing apparatus with containers, shaped by the machine, may have to carry out different types of work. In the case of containers with end lobes, the end lobes still projecting from the container, for instance are pressed together by a first unit, provided with adhesive material by a second unit, pressed against the walls of the container by a third unit, and possibly also held against the container for drying by a fourth unit. But there may also be provisions for a further unit imprinting, e.g., processing data. Such a unit is also used for containers without end lobes. The containers have to be advanced precisely to each of the finishing units, which are arranged in series, so that the processes enumerated above can be carried out satisfactorily.

So far slides have been used for the conveying of containers, which, however, proved to be inefficient, just as the already known conveyor belts or straps, since they do not guarantee a precise advance. It has been suggested to provide the conveyor belts with catches attachable to the individual containers, however, this necessitates synchronization of the feeding and advancing movements. Furthermore, there is the danger of damaging and deforming the containers with these catches.

The present invention has the object to avoid these disadvantages and is essentially characterized in that the apparatus is provided with a ground plate and a cover plate connected with it at a distance which corresponds to the height of the container, and in that the two plates are movable in the feeding direction of the containers as well as in the contrary direction by means of a drive, depending on the rhythm of the machine, and in that at least one of the two plates is provided on the inner surface with transverse grooves of a saw-toothed shape whose vertical walls are arranged at a distance which corresponds to the width of one container, located in front of the slanting walls, when seen in the feeding direction, and in the centre plane of each finishing unit, whereby the opposite devices of these units are arranged at such a distance that the containers are adjacent to them under pressure.

The container is fed into the apparatus of the present invention by means of a slide, said apparatus being suitably located at the same level as the separated container still in the machine. By arranging the devices of the finishing units on either side of the ground plate and of the cover plate at a distance which is less than container length, the containers are slightly pressed together so that their welding seams, facing either the ground or the cover plate, stand up from their folded position and engage in the grooves of either the ground plate or the cover plate, whereby the free edges of the welding seams are adjacent to the vertical walls of the saw-toothed grooves. Whenever the two plates which are connected with each other are moved by the width of one container in the feeding direction of the containers the grooves advance the containers. In this manner the containers are gradually brought to the individual finishing units by precise advances and without damage to them. After each advance, which may also amount to a multiple of the width of the container, the plates are brought back again into their original position. The reciprocating movement of the plates is adapted to the rhythm of the machine for making containers, whereby the drive of the apparatus according to the invention is suitably derived from the drive of the machine. In an embodiment of the apparatus according to the invention the cover plate as well as the ground plate are preferably provided with grooves.

In the drawings an embodiment of the invention is shown by way of example. FIGURES 1 and 2 show longitudinal sections of the apparatus along line I—I of FIG. 2 and line II—II of FIG. 1, and FIG. 3 shows a cross-section along line III—III in FIG. 1.

The apparatus according to FIGURES 1 to 3 is attached to a machine not shown in the drawings from which the containers separated from the tube are continuously advanced into the space between ground plate 1 and cover plate 2 of the apparatus by means of a slide of the machine. Containers with end lobes are fed in between the plates in such a manner that they are in the same position in which they were separated from the tube, and that their small side walls with welding seams are adjacent the plates, whereby the end lobes face the devices of the finishing units 3, 4, 5 which are located on either side of the plates and which are shown only schematically. For this reason the plates are located at a distance from each other which equals the small side walls of the containers. Cover plate 2 is hingedly connected with ground plate 1 by means of columns 7 screwed to plate 1 at the exit end 6 of the latter. The plates are movable in the feeding direction of the containers and contrary to it. For this purpose the ground plate, resting on rolls 8, is connected with a side rod 10 built into the frame 9, whose movement is adjusted to the rhythm of the machine, and which is effected by the drive of the machine by means of connecting elements not shown in the drawings. On the inner surfaces of the plates transverse grooves 11, 12 of a saw-toothed shape are located whose vertical walls 13 are arranged at a distance which corresponds to the width of the small sides of the container, and which are located in front of the slanting groove walls 14, when seen in the feeding direction. When the apparatus is at rest the vertical groove walls 13 are also in the centre planes of the finishing units 3, 4, 5, whereby the first unit presses the end lobes of the inserted container, the second provides for adhesive material, and the third presses the end lobes against the container and dries the adhesive material. The opposite devices of each finishing unit are arranged at a distance which is less than the length of the small sides of the container which is adjacent to the ground plate and to the cover plate. In front of the finishing units stationary side walls 15, 16 are arranged on either side of the plates. At the feeding ends of the side walls spring-mounted plates 17 are hinged, diverging from the feeding direction, which are turned by engagement with the inserted containers into alignment with the side walls, whereby the feeding of containers into the apparatus, in between the side walls, as well as between the devices of the finishing units is facilitated, since—as has been mentioned above—side walls and devices are arranged transversely to the feeding direction at a distance which is less than the length of the small sides of the container so that the containers have to be pushed into the apparatus under pressure. In this manner the containers are pressed between the side walls and the devices so that the folded welding seam on the side walls of the containers are made to stand up on account of the counter pressure exerted by the contents of the container, e.g., milk. If three containers are inserted at the beginning, then the first one rests between the plates, and their upright welding seams engage the first grooves of the plates, whereby the edges of the welding seams 18 are adjacent the vertical walls of the grooves 13 (container shown in FIG. 1 by dotted lines). When moving in the feeding direction of the containers by the width of one container plates 1, 2 advance the container resting between them and drop it at the first finishing unit 3. They immediately move back into their original position without taking along the container because it is arrested by the pressure exerted by the devices. Moving back with no load is simplified by the slanting groove walls 14 and since it is possible to lift the cover plate on account of being movably connected with the ground plate. By moving the cover plate in an upward direction the upright welding seams are furthermore prevented from being pushed down again during the backward movement. As soon as the apparatus has moved back into its original position another container is inserted into the apparatus by means of the slide of the machine, whereby the containers in the apparatus are advanced by the width of one container, and whereby the originally second container is moved in between the plates.

In the same manner the following containers are moved through the finishing units and finally leave the apparatus one by one, and are transported to the packaging unit by means of a transport device not shown in the drawings.

I claim:

1. An apparatus for advancing and finishing liquid filled containers of coated paper, plastic material and the like, having welding seams along their length, said apparatus being located behind a fabricating machine for making said containers to be finished with welding seams, comprising a longitudinally extending ground plate,
a longitudinally extending cover plate connected to said ground plate and spaced parallel therefrom by a distance which corresponds to the height of said contains to be finished,
a plurality of finishing units arranged in series along said plates,
each of said plurality of finishing units being oppositely arranged in pairs on both longitudinal sides of said plates facing into the space between said plates and spaced from each other by a distance less than the length of said containers for exerting a lateral pressure from both longitudinal sides on said containers when the latter are lengthwise therebetween,
means for moving said ground plate and said cover plate in a longitudinal feeding direction as well as in an opposite direction, respectively, dependent on the rhythm of said fabricating machine,
at least one of said plates being formed on the surface facing the other of said plates with transverse grooves each having a saw tooth shape and including a vertical wall and a slanted wall,
slide means for exerting a lateral pressure on said containers when entering said apparatus and disposed immediately behind said fabricating machine for making said containers,
said containers being liquid filled thereby their welding seam stands vertically when subjected to a lateral pressure in said apparatus due to the counter pressure exerted by the liquid therein causing said welding seam to engage in one of said transverse grooves,
said vertical wall of adjacent transverse grooves being spaced a distance in the longitudinal direction corresponding to the width of one of said containers, and
each of said vertical walls being located in the feeding direction ahead of said slanting wall of the same transverse groove and at least several of said vertical walls being located centrally between said plurality of finishing units, respectively, after movement of said plates.

2. The apparatus, as set forth in claim 1, wherein
said ground plate extends beyond said cover plate between said plurality of finishing units and said fabricating machine, and
stationary side walls disposed between said fabricating machine and said plurality of finishing units and oppositely arranged in parallel extending adjacent both longitudinal sides of said ground plate and spaced from each other by a distance less than the length of said containers for exerting a lateral pressure on said containers when said containers are lengthwise therebetween.

3. The apparatus, as set forth in claim 2, wherein
said slide means comprises two oppositely spring mounted plates hinged to said stationary side walls at the end thereof remote from said plurality of finishing units and converging in the feeding direction, and
said end of said stationary side walls forming a widened recess into which said spring mounted plates are disposed.

4. The apparatus, as set forth in claim 1, wherein
the end of said cover plate beyond said plurality of finishing units in the feeding direction, is connected with said ground plate, so as to be jointly movable together therewith.

References Cited

UNITED STATES PATENTS 3,011,298   12/1961   Proctor _____ 53—387 X
3,145,518   8/1964   Ricca _____ 53—387

TRAVIS S. McGEHEE, *Primary Examiner.*